(12) United States Patent
Dorrer et al.

(10) Patent No.: US 9,188,244 B2
(45) Date of Patent: Nov. 17, 2015

(54) MICROFLUIDIC DEVICE, MICROFLUIDIC SYSTEM AND METHOD FOR TRANSPORTING FLUIDS

(75) Inventors: Christian Dorrer, Stuttgart (DE); Jochen Rupp, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 432 days.

(21) Appl. No.: 13/541,722

(22) Filed: Jul. 4, 2012

(65) Prior Publication Data

US 2013/0008511 A1 Jan. 10, 2013

(30) Foreign Application Priority Data

Jul. 7, 2011 (DE) .................... 10 2011 078 770

(51) Int. Cl.
*F16K 11/20* (2006.01)
*F16K 99/00* (2006.01)
*F04B 19/00* (2006.01)
(Continued)

(52) U.S. Cl.
CPC ....... *F16K 99/0015* (2013.01); *B01L 3/502738* (2013.01); *B01L 3/502776* (2013.01); *F04B 19/006* (2013.01); *F04B 43/043* (2013.01); *F16K 99/0059* (2013.01); *B01L 3/50273* (2013.01); *B01L 2300/0816* (2013.01); *B01L 2300/0867* (2013.01); *B01L 2300/0874* (2013.01); *B01L 2400/0481* (2013.01); *B01L 2400/0655* (2013.01); *F16K 2099/008* (2013.01); *F16K 2099/0084* (2013.01); *Y10T 137/0318* (2015.04); *Y10T 137/87096* (2015.04)

(58) Field of Classification Search
CPC .......... F16K 99/0001; F16K 2099/008; F16K 99/0015

USPC ........................... 137/597, 885; 422/500–570
See application file for complete search history.

(56) References Cited

U.S. PATENT DOCUMENTS

| 7,201,178 B2* | 4/2007 | Gupta et al. | 137/1 |
| 7,561,672 B2* | 7/2009 | Lee | 379/88.03 |
| 7,607,641 B1* | 10/2009 | Yuan | 251/331 |

(Continued)

FOREIGN PATENT DOCUMENTS

| DE | 103 02 720 A1 | 8/2004 |
| WO | 2008/115626 A2 | 9/2008 |
| WO | 2009/149986 A1 | 12/2009 |

OTHER PUBLICATIONS

Unger et al., Monolithic Microfabricated Valves and Pumps by Multilayer Soft Lithography, Science Magazine, vol. 288, pp. 113-116, Apr. 7, 2000.

*Primary Examiner* — John K Fristoe, Jr.
*Assistant Examiner* — Reinaldo Sanchez-Medina
(74) *Attorney, Agent, or Firm* — Maginot, Moore & Beck LLP (57) ABSTRACT

A microfluidic device includes a first supply channel and a first discharge channel fluidically connected to one another by a first valve. The device also includes a second supply channel and a second discharge channel fluidically connected to one another by a second valve. At least one of the first channels can be fluidically connected to at least one of the second channels by a T-valve. The device also includes a control unit for controlling the valves, the control unit being configured in such a way that a first fluid from one of the first channels and a second fluid in one of the second channels can be laminated in parallel by actuating the valves in one of the first or second channels. A microfluidic system and a method for transporting fluids, and a use thereof are also disclosed.

18 Claims, 5 Drawing Sheets

(51) Int. Cl.
  *F04B 43/04* (2006.01)
  *B01L 3/00* (2006.01)

(56) References Cited

U.S. PATENT DOCUMENTS

| | | |
|---|---|---|
| 2001/0055242 A1 | 12/2001 | Deshmukh et al. |
| 2002/0148992 A1 | 10/2002 | Hayenga et al. |
| 2003/0196714 A1 | 10/2003 | Gilbert et al. |
| 2004/0209354 A1* | 10/2004 | Mathies et al. ............ 435/287.2 |
| 2005/0205816 A1 | 9/2005 | Hayenga et al. |
| 2007/0095407 A1* | 5/2007 | Chen et al. .................... 137/597 |
| 2009/0142845 A1 | 6/2009 | Benali et al. |
| 2009/0166203 A1 | 7/2009 | Tian et al. |
| 2010/0018584 A1 | 1/2010 | Bransky et al. |
| 2010/0252123 A1* | 10/2010 | Mathies et al. ................ 137/206 |
| 2010/0303687 A1* | 12/2010 | Blaga et al. ................... 422/504 |

* cited by examiner

MICROFLUIDIC DEVICE, MICROFLUIDIC SYSTEM AND METHOD FOR TRANSPORTING FLUIDS

This application claims priority under 35 U.S.C. §119 to patent application no. DE 10 2011 078 770.4, filed on Jul. 7, 2011 in Germany, the disclosure of which is incorporated herein by reference in its entirety.

The disclosure relates to a microfluidic device, to a microfluidic system, to a method for transporting fluids and to a use.

BACKGROUND

Microfluidic devices are used in particular in order to manipulate liquids.

The technical publication M. Unger et al., Science 2000, page 288, paragraphs 113 to 116, for example, discloses a microfluidic device in the form of a microfluidic compression valve, which is produced from polydimethylsiloxane.

WO 2009/149986 A1 furthermore discloses a microfluidic compression valve and a method for its production. The compression valve comprises three substrates, the third substrate being arranged between the first and second substrates and consisting of an elastic material. Furthermore, the first substrate adjoins the third substrate and has at least one first recess on the side which adjoins the third substrate. The second substrate likewise adjoins the third substrate and has a second recess on the side which adjoins the third substrate. The first and second recesses are arranged at least partially opposite one another.

US 2010/0018584 A1 discloses a microfluidic system, comprising a piezoelectric actuator with which pressure can be exerted on a wall of a channel conveying fluid. When the piezoelectric actuator is operated, the wall of the microfluidic channel is deformed and the flow of the fluid can be controlled, or influenced.

US 2005/0205816 A1 discloses a pneumatically actuable microfluidic valve for use in laminated plastic fluidic structures. The microfluidic valve comprises a supply channel and a discharge channel, which are closable with a common membrane. The membrane can furthermore be moved into a recess, and a pressure can be applied to the recess by means of a further channel. If the pressure of the fluid in the supply channel is greater than the pressure in the recess, then the membrane is moved into the recess and liquid can flow from the supply channel into the discharge channel. If the pressure in the recess is increased so that it exceeds the pressure of the fluid in the supply channel, the membrane closes the supply channel and the discharge channel and no further liquid can flow from the supply channel into the discharge channel.

Lastly, US 2009/0166203 A1 discloses a microchip for capillary electrophoresis. The microchip comprises a supply channel and a separation channel, which are configured to receive a sample which is provided by a sample source. The sample source is arranged at one end of the separation channel. The supply channel and the separation channel form a T-junction. The microchip furthermore comprises a first valve, which is arranged next to the T-junction, and a separation channel and a second valve, which is arranged at the T-junction. The second valve is a two-way valve. When the second valve is closed in a vertical direction, the first and second ends of the separation channel are not in direct fluidic connection. When the second valve is closed in a horizontal direction, there is no fluidic connection between the first end/second end of the separation channel and the supply channel. Between the first end of the supply channel and the first end of the separation channel, however, there is a fluidic connection. Similarly, there is likewise a fluidic connection between the first end of the supply channel and the second end of the separation channel.

SUMMARY

The disclosure relates to a microfluidic device, comprising a first supply channel and a first discharge channel, which can be fluidically connected to one another by means of a first valve, a second supply channel and a second discharge channel, which can be fluidically connected to one another by means of a second valve, wherein at least one of the first channels can be fluidically connected to at least one of the second channels by means of a T-valve, and a control unit for controlling the valves, the control unit being configured in such a way that a first fluid from one of the first channels and a second fluid in one of the second channels can be laminated in parallel by means of actuating the valves in one of the first or second channels.

The disclosure also relates to a microfluidic system, comprising a microfluidic device, and a hybridization device.

In addition, the disclosure relates to a method for transporting fluids, in particular suitable for being carried out with a microfluidic device and/or with a microfluidic system, comprising the steps: closing a T-valve between a first supply channel or discharge channel and a second supply channel or discharge channel, opening a first valve between the first supply channel and the first discharge channel and opening a second valve between the second supply channel and the second discharge channel, the first valve or the second valve being arranged downstream of the T-valve, applying a first fluid to the first channels and a second fluid to the second channels, closing the first and second valves, opening the T-valve, further application of the respective first or second fluid to one of the supply channels, the supply channel receiving fluid being the supply channel in which the T-valve is arranged upstream of the respective first or second valve, parallel lamination and discharge of the two fluids through the first or second discharge channel.

The disclosure further relates to a use of a T-valve of a microfluidic device as a pump.

In the description, the terms supply channel and discharge channel are intended respectively to mean either a separate channel or different sections of a single channel. Both the supply channel and the discharge channel may be configured suitably for supplying as well as discharging a fluid.

One of the advantages of features of the disclosure is that a microfluidic device in the form of a controllable microfluidic T-junction can thereby be provided, which requires as small as possible a volume of fluid. Another advantage is that overall a smaller amount of fluid is thereby necessary in order, for example, to carry out an analysis of a first fluid with a second fluid in a microfluidic system. Furthermore, inclusion or occurrence of air bubbles in the microfluidic system when fluids are applied to the microfluidic system is substantially avoided. Lastly, application of fluids to the microfluidic device and to the microfluidic system is possible in a simple and reliable way; at the same time, the number of supply and discharge channels as well as additional valves is kept as small as possible.

Further advantageous refinements of features of the disclosure are described below.

According to one advantageous refinement of the disclosure, at least one of the valves is configured to be pneumatically actuable. The advantage thereby achieved is that it permits control of the valves in a simple and reliable way.

According to another advantageous refinement of the disclosure, at least one of the first and second channels comprises at least one bend in the region of the T-valve, in particular between 60° and 130°, preferably between 75° and 115°, particularly expediently between 85° and 95°. In this way, an arrangement of the supply and discharge channels particularly conducive to flow is achieved, so that parallel lamination of the two fluids is made possible even more reliably.

According to another advantageous refinement of the disclosure, the first valve is arranged in the first supply channel and the second valve is arranged in the second discharge channel, or the first valve is arranged in the first discharge channel and the second valve is arranged in the second supply channel. High flexibility of the microfluidic device is achieved in this way, since the two valves can be arranged according to the intended requirements and at the same time the number of valves and channels is restricted to a minimum.

According to another advantageous refinement of the disclosure, the first and second channels are arranged fluidically separated by a web in the region of the T-valve. Simple and at the same time reliable separation of the first and second channels is achieved in this way.

According to another advantageous refinement of the disclosure, the web has a width and/or height of between 50 and 500 μm, in particular between 100 and 300 μm, preferably between 150 and 250 μm, expediently essentially 200 μm. Besides an installation space which is as small as possible, extremely reliable fluidic separation of the first and second channels is also achieved in this case.

According to another advantageous refinement of the disclosure, the first and/or second channels have a width of between 50 and 1000 μm, in particular between 200 and 600 μm, preferably between 450 and 550 μm, expediently essentially 400 μm. The advantage thereby achieved is that on the one hand the installation space is therefore as small as possible, but at the same time a sufficient fluid flow in the first and second channels is still made possible.

According to another advantageous refinement of the disclosure, the first and/or second channels have a depth of less than 75% of the width, in particular less than 66.7% of the width, preferably less than 60% of the width, in particular essentially 50% of the width. The advantage thereby achieved is that on the one hand the installation space is therefore as small as possible, but at the same time a sufficient fluid flow in the first and second channels is still made possible.

According to another advantageous refinement of the disclosure, at least one of the valves is configured as a compression valve. The at least one valve is therefore extremely economically producible and simply actuable.

According to another advantageous refinement of the microfluidic system, the T-valve is configured as a pump. In this way, for example, the T-valve can make it possible both to mix liquids and to pump fluids by means of the T-valve, which saves on channels with further valves and therefore reduces the production costs of the microfluidic system.

According to another advantageous refinement of the microfluidic system, at least two plastic layers are arranged with an elastic sheet arranged between them, and at least the channels of the microfluidic device are formed in the at least two plastic layers. In this way, the microfluidic system can be produced extremely economically and compactly.

BRIEF DESCRIPTION OF THE DRAWINGS

Other features and advantages of the disclosure may be found in the following description of exemplary embodiments with the aid of the drawings in which, particularly in schematic form:

FIGS. 2a-2b show detail representations of the embodiment of FIG. 1a;

DETAILED DESCRIPTION

Figure 1A:
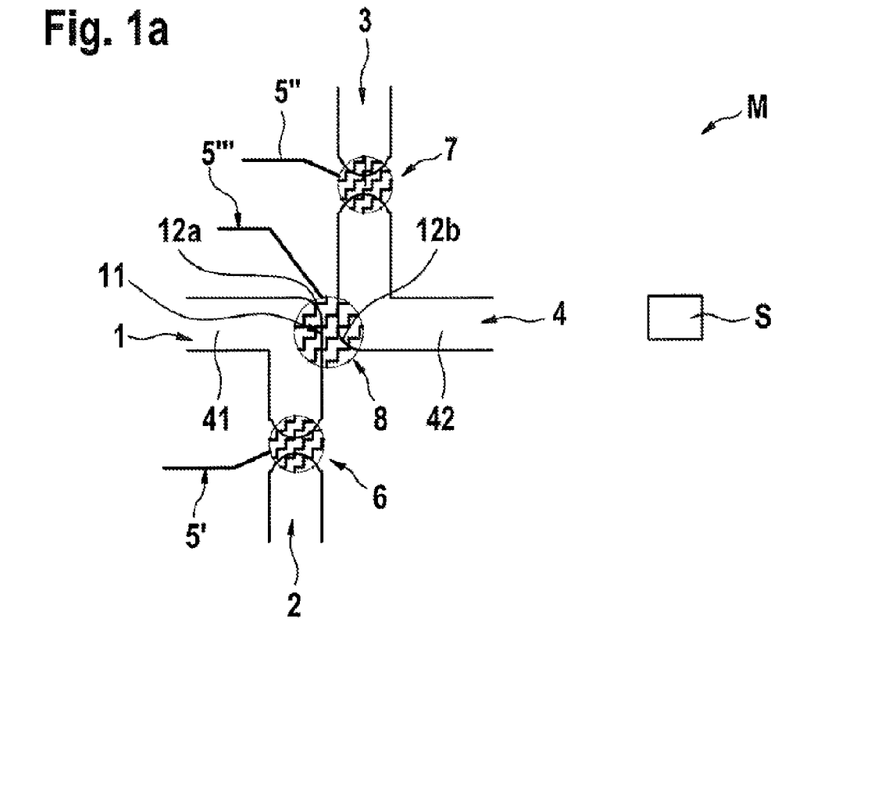
FIG. 1a shows a microfluidic device according to a first embodiment of the present disclosure.

FIG. 1a shows a microfluidic device according to a first embodiment of the present disclosure.

FIG. 1a shows a microfluidic device M. The microfluidic device M comprises a first supply channel 1, which can be fluidically connected by means of a first valve 6 to a first discharge channel 2. The first valve 6 can be actuated pneumatically by means of a first pneumatic supply line 5'. The microfluidic device M according to FIG. 1a furthermore comprises a second supply channel 3, which can be fluidically connected by means of a second valve 7 to a second discharge channel 4. The second valve 7 can also be actuated pneumatically by means of a second pneumatic supply line 5". In FIG. 1a, the first supply channel 1 has a first bend 12a of essentially 90°. The second discharge channel 4 likewise has a second bend 12b of essentially 90°. Overall, the first supply channel 1 and the second discharge channel 4 are arranged in the shape of a cross in the plan view according to FIG. 1, a T-valve 8 being arranged in the region of the mid-point of the "cross".

The first supply channel 1 and the second supply channel 4 are separated by a web 11 of the T-valve 8. The T-valve 8 can also be actuated pneumatically by means of a third pneumatic supply line 5'''. In order for a first fluid 41 in the first channels 1, 2 and a second fluid 42 in the second channels 3, 4 to be laminated in parallel without inclusion of air bubbles lying between them, a first fluid 41 and a second fluid 42 are initially applied respectively to the first or second supply channel 1, 3 simultaneously or alternatively in succession. The first valve 6 and the second valve 7 are in this case opened, and the T-valve 8 is closed, by applying pressure to the T-valve 8 by means of the corresponding pneumatic supply line 5.

In the region of the T-valve 8, the two fluid-conveying first and second channels 1, 2, 3, 4 are separated by a web 11 of the T-valve 8, that is to say the two fluids 41, 42 in the respective first and second channels 1, 2, 3, 4 have not yet been mixed. Likewise, there are no air bubbles in the first and second channels 1, 2, 3, 4. Subsequently, pressure is then applied to the first valve 6 and the second valve 7 by means of the first pneumatic supply line 5' and the second pneumatic supply line 5", so that they are closed. The T-valve 8 is relieved of pressure by means of the third pneumatic supply line 5''', and therefore opened. Through the first supply channel 1, pressure is applied to the first fluid 41 so that it is brought into contact with the second fluid 42 by means of the T-valve 8, without air bubbles being contained or able to form between the two, first and second, fluids 41, 42. Both the first and second fluids 41, 42 can then be discharged through the second discharge channel 4 for further processing, for example for analysis in an analysis device. The effect achievable by this is that the first fluid 41 and the second fluid 42 are aligned mutually parallel but nevertheless remain separated from one another. With this procedure, the first fluid 41 and the second fluid 42 are so to speak laminated on one another. The first fluid 41 and the second fluid 42 thus lie smoothly on one another without turbulence, the formation of air bubbles or substantial mixing of the first fluid 41 and the second fluid 42 taking place. The discharge through the second discharge channel takes place in such a way that the first fluid 41 and the second fluid 42 flow essentially free of mixing and mutually parallel over the air bubble-free contact surface between the first fluid 41 and the second fluid 42, that is to say the first fluid 41 and the second fluid 42 are laminated in parallel.

As an alternative, the second valve 7 may remain open and the second fluid 42 may be displaced in the direction of the T-valve 8 through the second supply channel 3. The first and second fluids 41, 42 are thereby laminated in parallel in the region of the T-valve 8, as described above, and can be discharged through the second discharge channel 4 for further processing.

It is in this case also possible for application of the respective first or second fluid 41, 42 to the channels 1 and 4 next to the respective T-valve 8 to take place in reverse, through the first discharge channel 2 or through the second discharge channel 4. Accordingly, after the parallel lamination of the two, first and second, fluids 41, 42, the fluids 41, 42 laminated in parallel may then be discharged for further processing through the other respective channel 2, 3.

Figure 1B:
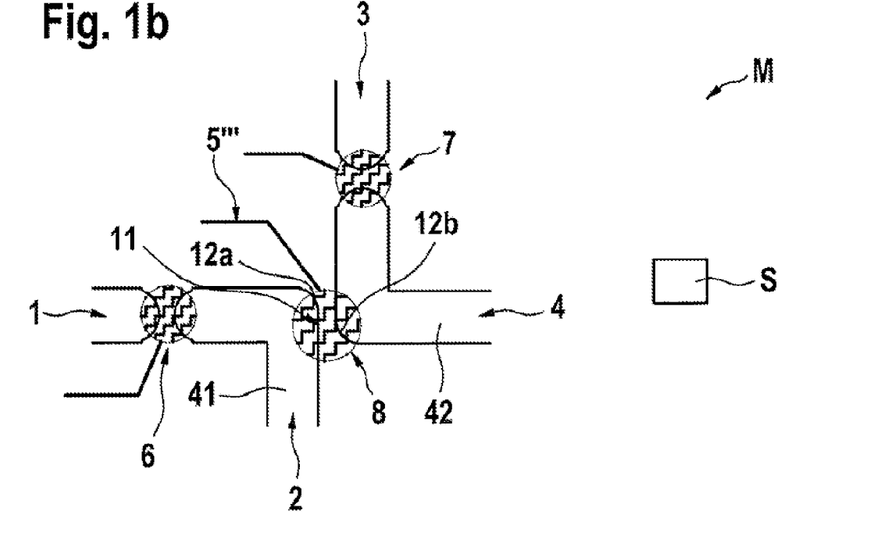
FIG. 1b shows a microfluidic device according to a second embodiment of the present disclosure.

FIG. 1b essentially shows a microfluidic device according to FIG. 1a. In contrast to FIG. 1a, the second valve 6 is now arranged downstream of the T-valve 8. Application to the T-valve 8, or the corresponding neighboring first and second channels 2, 4, is again carried out by opening the first valve 6 and the second valve 7. In order for the two, first and second, fluids 41, 42 to be laminated in parallel, the first valve 6 and the second valve 7 are in turn closed and the T-valve 8 is opened. The second fluid 42 is then displaced through the second discharge channel 4 in the direction of the T-valve 8 and comes in contact with the first fluid 41 in the region of the T-valve 8. The first and second fluids 41, 42 may then be discharged through the first discharge channel 2 for further processing. As an alternative, the first valve 6 may remain open so that the first fluid 41 is then displaced through the first supply channel 1 and the second fluid 42 is then displaced through the second discharge channel 4. The first and second fluids 41, 42 are then laminated in parallel in the region of the T-valve 8 and may then be discharged through the first discharge channel 2 for further processing.

Figure 2A:
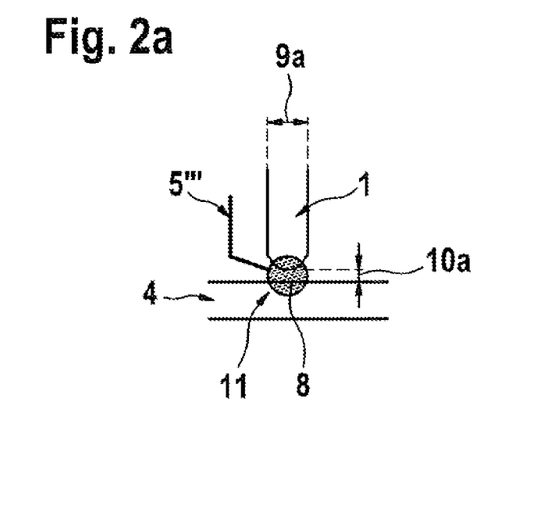
Figure 2B:
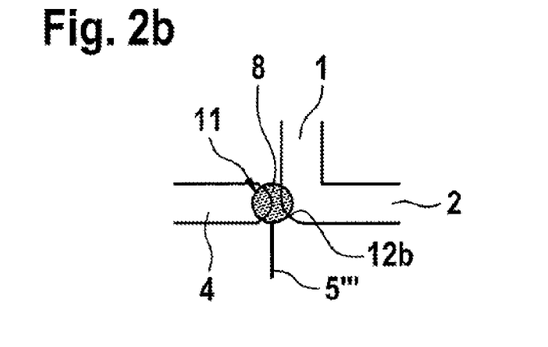
Figure 2C:
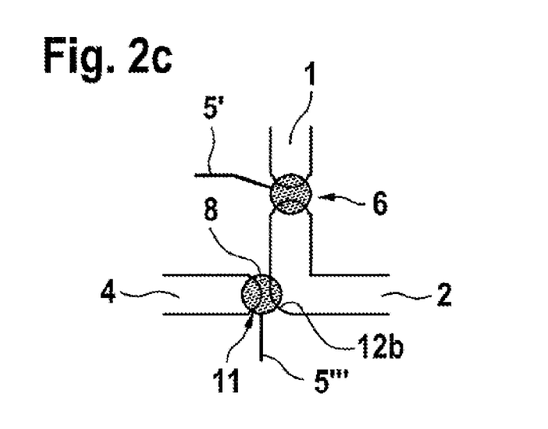
FIG. 2c shows an embodiment of the supply and discharge channels depicted in FIG. 2b.

FIG. 2 show detail representations of the embodiment of FIGS. 1a, 1b.

FIG. 2a essentially shows a plan view of an arrangement of a first supply channel 1 and a second discharge channel 4. The first supply channel 1 is in this case arranged essentially at a right angle to the second discharge channel 4, and spaced apart fluidically separated therefrom by means of the T-valve 8 comprising a web 11 with a width 10, although they can be fluidically connected by actuating the T-valve 8. The T-valve 8 can again be actuated pneumatically by means of a third pneumatic supply line 5'''. The first supply channel 1 in this case has a predetermined width 9.

In FIG. 2b, the first supply channel 1 has a second bend 12b of essentially 90°. The T-valve 8 and a third pneumatic supply line 5''', provided for the T-valve 8, are arranged in the region of the second bend 12b. The second discharge channel 4 is arranged separated from the first supply channel 1 by means of a web 11. By means of the T-valve 8, a second fluid 42 in the second discharge channel 4 can then be transferred from the second discharge channel 4 into the first supply channel 1 with a first fluid 41, so that the two, first and second, fluids 41, 42 are laminated in parallel.

FIG. 2c essentially represents supply and discharge channels according to FIG. 2b. In contrast to FIG. 2b, the first supply channel 1 is arranged separated from the first discharge channel 2 by means of a first pneumatically actuable valve 6.

FIGS. 3a-3d show plan views and cross sections of a valve of the microfluidic device according to the first and second embodiments of the disclosure.

Figure 3A:
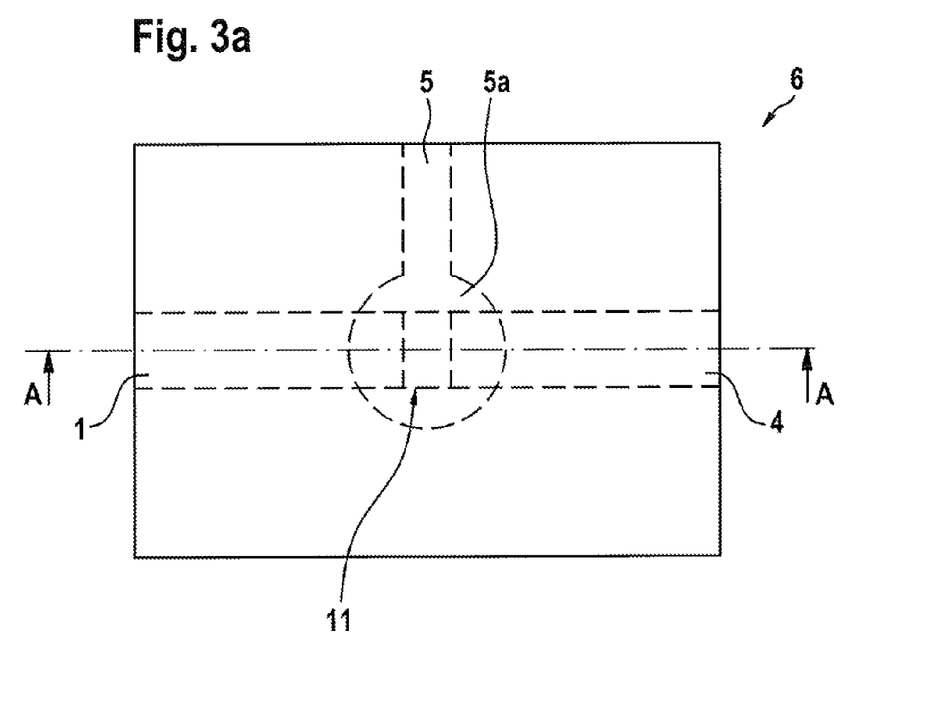
FIGS. 3a, 3b respectively show a plan view and a cross section of a valve of the microfluidic device according to the first embodiment of the disclosure.
Figure 3B:
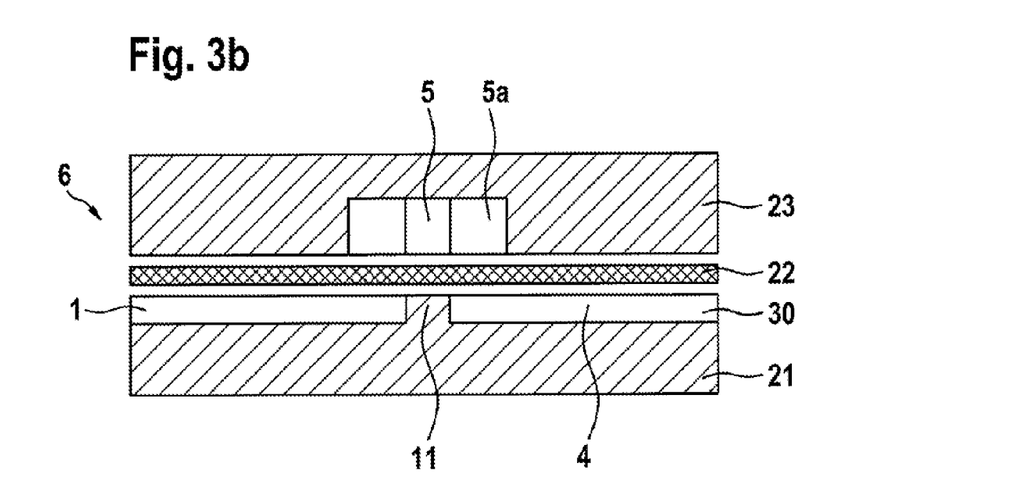

FIG. 3a and FIG. 3b show a structure of a first valve 6 in plan view and in cross section along the section line A-A.

FIG. 3a shows a plan view from above of the first valve 6. A first supply channel 1 and a second discharge channel 4 can be seen, which are arranged separated by means of a web 11. The channels 1, 4 are formed in a first polymer layer 21, as is the web 11. A sheet 22 (see FIG. 3b) is arranged thereover in the form of a membrane, which is covered by a second polymer layer 23. A circular recess 5a with a pneumatic supply line 5 is arranged in the second polymer layer 23. By means of the pneumatic supply line 5, pressure can be applied to the recess 5a so that, from a raised position in FIG. 3b, with a correspondingly high pressure the membrane 22 bears flat on the web 11 and thus fluidically separates the two channels 1, 4.

Figure 3C:
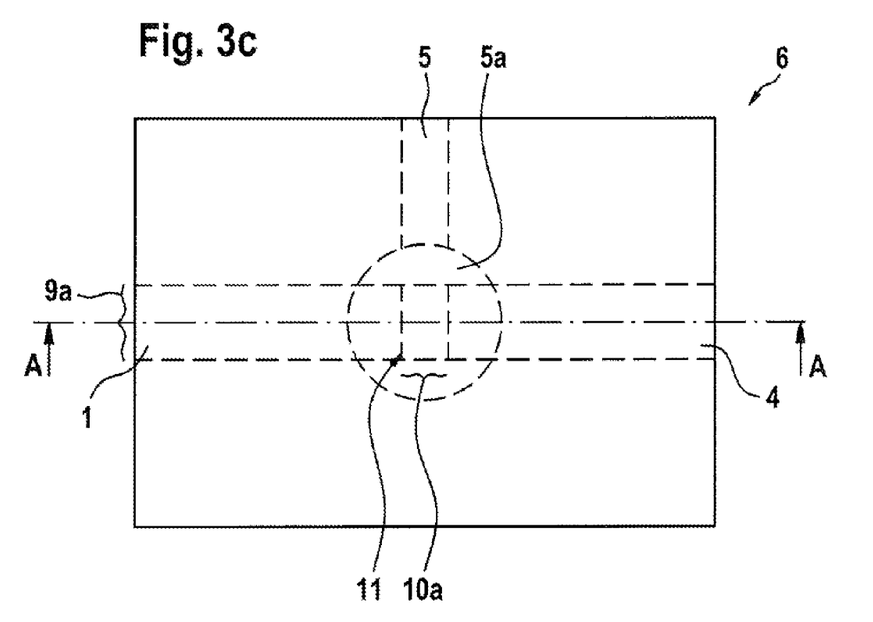
FIGS. 3c, 3d respectively show a plan view and a cross section of a valve of the microfluidic device according to the second embodiment of the disclosure.
Figure 3D:
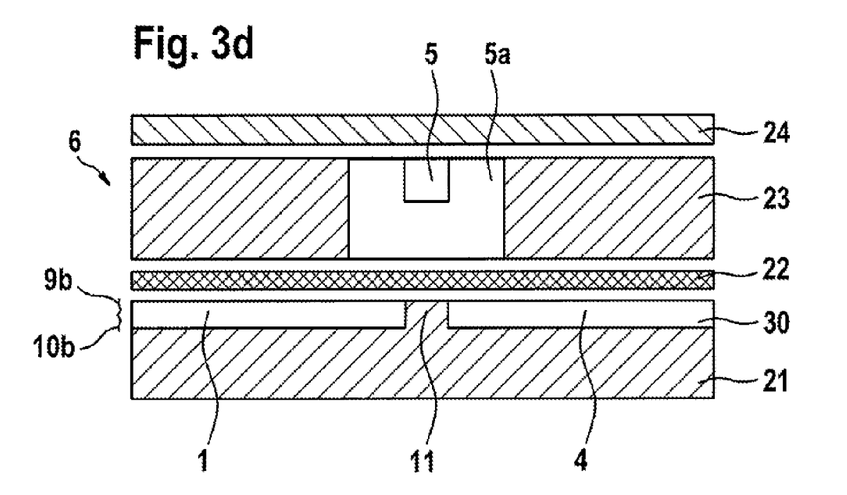

FIGS. 3c and 3d show another embodiment of a first valve 6 in plan view and in cross section along the section line A-A.

In contrast to the valve of FIGS. 3a, 3b, a third polymer layer 24 is arranged in FIGS. 3c and 3d. The second polymer layer 23 fully comprises a recess 5a, to which pressure can be applied pneumatically by means of a pneumatic supply line 5 of smaller cross section. The functional principle of the first valve 6 according to FIGS. 3c and 3d corresponds essentially to that of FIGS. 3a and 3b. Pressure can be applied to the recess 5a in the second polymer layer 23 by means of the pneumatic supply line 5. When pressure is applied to the recess 5a, the membrane 22 is pressed onto the web 11 if the pressure of the fluid in the first supply channel 1 is less than the pressure in the recess 5a. The membrane 22 then fluidically separates the first supply channel 1 from the second discharge channel 4. If the pressure of the fluid in the first supply channel 1 is increased further, until it is greater than the pressure in the recess 5a, the membrane 22 is raised and the first supply channel 1 is in fluidic connection with the second discharge channel 4, so that the fluid can flow from the first supply channel 1 into the second discharge channel 4.

Figure 4:
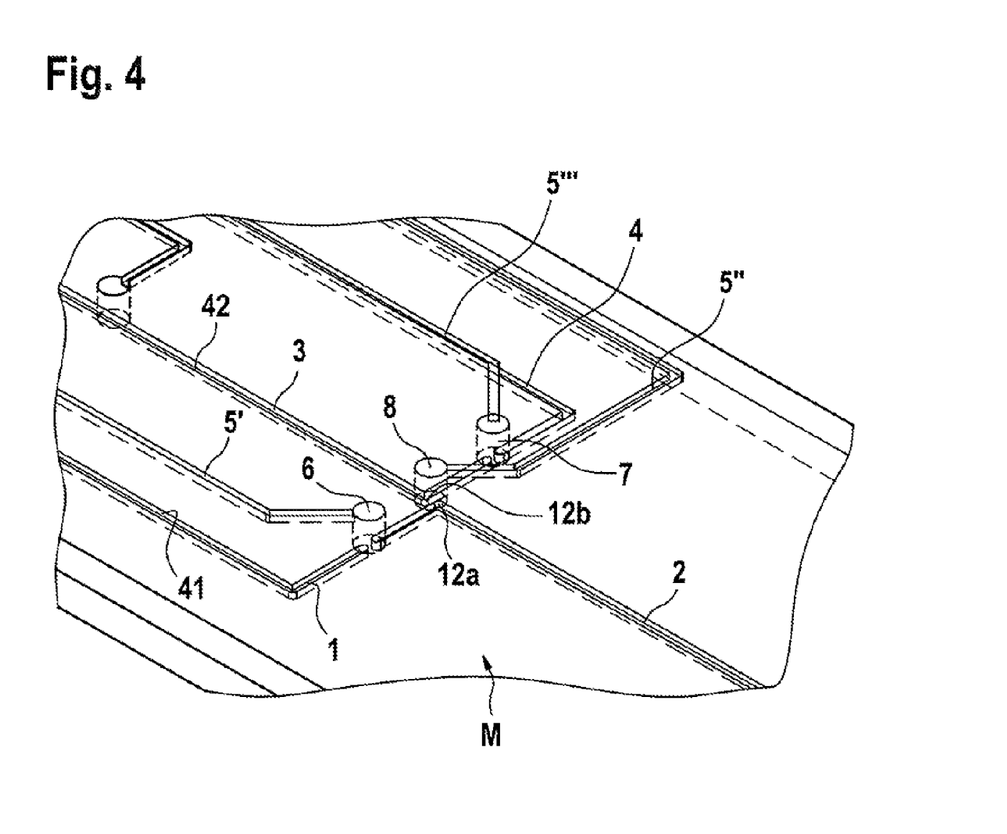
FIG. 4 shows a three-dimensional representation of a microfluidic system of a third embodiment of the present disclosure.

FIG. 4 shows a three-dimensional representation of a microfluidic system of a third embodiment of the present disclosure.

FIG. 4 essentially shows an isometric view of another embodiment of the microfluidic device M similar to FIGS. 1a and 1b. In the middle of FIG. 4, a T-valve 8 can be seen, which is connected on the one hand to a first discharge channel 2, which is connected by means of a first valve 6 to a first supply channel 1, and on the other hand to a second discharge channel 4, which is connected by means of a second valve 7 to a second supply channel 3. A pressure can respectively be applied to the first valve, second valve and T-valve 6, 7, 8 by means of first, second and third pneumatic supply lines 5', 5'', 5'''. Furthermore, the first discharge channel 2 and the second discharge channel 4 respectively have a first and a second bend 12a, 12b of essentially 90 degrees in the region of the T-valve 8, and form a "cross" in plan view in a similar way to FIG. 1a. In order for a first fluid 41 in the first supply channel 1 and a second fluid 42 in the second supply channel 2 to be laminated in parallel, initially the first and second valves 6 and 7 are opened and the T-valve 8 is closed. In this way, the respective first and second fluids 41, 42 are also applied to the first and second discharge channels 2 and 4. Subsequently, the first and second valves 6, 7 are closed and the T-valve 8 is opened. When the second fluid 42 is then displaced further through the second supply channel 3, the second fluid 42 is transferred by means of the T-valve 8 into the first discharge channel 2 and comes in contact with the first fluid 41. The first and second fluids 41, 42 then leave the microfluidic device M laminated in parallel, that is to say aligned mutually parallel, with an essentially mixing-free contact surface and at the same flow rate, and essentially without air bubbles or air inclusions, through the first discharge channel 2. As an alternative, in reverse fashion the first valve 6 may remain open, in which case the first fluid 41 is then displaced through the first supply channel 1 and the second fluid 42 is displaced through the second discharge channel 4. The first and second fluids 41, 42 are then laminated in parallel in the region of the T-valve 8 and leave the microfluidic device M through the first discharge channel 2.

Although the present disclosure has been explained above with the aid of preferred exemplary embodiments, it is not restricted thereto but may be modified in a variety of ways.

For example, it is possible to replace the valves, in such a way that flow can only take place through the respective channel in one direction, in order to avoid back flows. It is furthermore possible to carry out the actuation of the valves not only pneumatically but alternatively also electrically, for example by means of piezo elements, in particular piezoelectric elements.

What is claimed is:

1. A microfluidic device, comprising:
    a first supply channel and a first discharge channel that are configured to be fluidically connected to one another by a first valve,
    a second supply channel and a second discharge channel that are configured to be fluidically connected to one another by a second valve,
    a T-valve directly connected to at least one of the first channels and at least one of the second channels and configured to directly fluidically connect the at least one of the first channels to the at least one of the second channels, and
    a control unit configured to control the valves such that a first fluid flows through the first valve and a different second fluid flows through the second valve with the T-valve in a closed position, the control unit being further configured such that the first fluid in one of the first channels and the second fluid in one of the second channels are laminated in parallel in one of the first channels or the second channels by actuating the T-valve to open and by actuating at least one of the first valve and the second valve.

2. The microfluidic device according to claim 1, wherein at least one of the first and second channels comprises a bend, the T-valve positioned at the bend.

3. The microfluidic device according to claim 2, wherein the bend is configured to define an angle between 60 degrees and 130 degrees.

4. The microfluidic device according to claim 2, wherein the bend is configured to define an angle between 75 degrees and 115 degrees.

5. The microfluidic device according to claim 2, wherein the bend is configured to define an angle between 85 degrees and 95 degrees.

6. The microfluidic device according to claim 1, further comprising a web positioned in the region of the T-valve, wherein:
    the first and second channels are arranged fluidically separated by the web.

7. The microfluidic device according to claim 6, wherein the web has a width and/or height of between 50 and 500 micrometers.

8. The microfluidic device according to claim 5, wherein the web has a width and/or height of between 100 and 300 micrometers.

9. The microfluidic device according to claim 1, wherein the first and/or second channels have a width of between 50 and 1000 micrometers.

10. The microfluidic device according to claim 9, wherein the first and/or second channels have a width of between 200 and 600 micrometers.

11. The microfluidic device according to claim 9, wherein the first and/or second channels have a depth of less than 75% of the width.

12. The microfluidic device according to claim 11, wherein the first and/or second channels have a depth of less than 66.7% of the width.

13. The microfluidic device according to claim 1, wherein at least one of the valves is configured to be pneumatically actuated.

14. The microfluidic device according to claim 1, wherein (i) the first valve is arranged in the first supply channel and the second valve is arranged in the second discharge channel, or (ii) the first valve is arranged in the first discharge channel and the second valve is arranged in the second supply channel.

15. The microfluidic device according to claim 1, wherein at least one of the valves is configured as a compression valve.

16. A microfluidic system, comprising:
    a microfluidic device including:
    a first supply channel and a first discharge channel that are configured to be fluidically connected to one another by a first valve,
    a second supply channel and a second discharge channel that are configured to be fluidically connected to one another by a second valve,
    a T-valve directly connected to at least one of the first channels and at least one of the second channels and configured to directly fluidically connect the at least one of the first channels to the at least one of the second channels
    a control unit configured to control the valves such that a first fluid flows through the first valve and a different second fluid flows through the second valve with the T-valve in a closed position, the control unit being further configured such that the first fluid in one of the first channels and the second fluid in one of the second channels are laminated in parallel in one of the first channels or the second channels by actuating the T-valve to open and by actuating at least one of the first valve and the second valve; and
    a hybridization device.

17. The microfluidic system according to claim 16, wherein the T-valve is configured as a pump.

18. The microfluidic system according to claim 16, further comprising at least two plastic layers arranged with an elastic sheet positioned between them, wherein:
    at least the first channels and the second channels of the microfluidic device are formed in the at least two plastic layers.

* * * * *

UNITED STATES PATENT AND TRADEMARK OFFICE
CERTIFICATE OF CORRECTION

PATENT NO. : 9,188,244 B2  
APPLICATION NO. : 13/541722  
DATED : November 17, 2015  
INVENTOR(S) : Dorrer et al.

Page 1 of 1

It is certified that error appears in the above-identified patent and that said Letters Patent is hereby corrected as shown below:

Claims

In column 8, lines 9-11, claim 8 should read as follows:

8. The microfluidic device according to claim 7, wherein the web has a width and/or height of between 100 and 300 micrometers.

Signed and Sealed this  
Thirty-first Day of May, 2016

Michelle K. Lee  
*Director of the United States Patent and Trademark Office*